(12) United States Patent
Park et al.

(10) Patent No.: US 9,673,473 B2
(45) Date of Patent: Jun. 6, 2017

(54) REDOX FLOW BATTERY

(71) Applicant: SAMSUNG ELECTRONICS CO., LTD., Suwon-si, Gyeonggi-do (KR)

(72) Inventors: Joung-won Park, Yongin-si (KR); Myung-jin Lee, Seoul (KR); Basab Roy, Hwaseong-si (KR); Duk-jin Oh, Seoul (KR); Doo-yeon Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/077,452

(22) Filed: Nov. 12, 2013

(65) Prior Publication Data
US 2014/0170460 A1  Jun. 19, 2014

(30) Foreign Application Priority Data
Dec. 14, 2012 (KR) .................. 10-2012-0146622

(51) Int. Cl.
*H01M 6/16* (2006.01)
*H01M 8/18* (2006.01)
*H01M 8/20* (2006.01)

(52) U.S. Cl.
CPC ............ *H01M 8/188* (2013.01); *H01M 8/20* (2013.01); *H01M 2300/0025* (2013.01); *H01M 2300/0091* (2013.01); *Y02E 60/528* (2013.01)

(58) Field of Classification Search
CPC ........ H01M 8/188; H01M 8/20; Y02E 60/528
See application file for complete search history.

(56) References Cited

U.S. PATENT DOCUMENTS

| 4,192,910 A | 3/1980 | Giner et al. |
| 4,591,453 A | 5/1986 | Kobayashi |

(Continued)

FOREIGN PATENT DOCUMENTS

| JP | 6215770 A | 1/1987 |
| JP | 62015770 A | 1/1987 |

(Continued)

OTHER PUBLICATIONS

Y-W D. Chen et al., Solution Redox Couples for Electrochemical Energy Storage: I. Iron (III)-Iron (II) Complexes with O-Phenanthroline and Related Ligands, J. Eletrochem. Soc.: Electrochemical Science and Technology, vol. 128, No. 7, Jul. 1981, pp. 1460-1467.

(Continued)

*Primary Examiner* — Patrick Ryan
*Assistant Examiner* — Ben Lewis
(74) *Attorney, Agent, or Firm* — Cantor Colburn LLP

(57) ABSTRACT

Provided is a redox flow battery including a positive electrode cell having a positive electrode and a catholyte solution; a negative electrode cell having a negative electrode and an anolyte solution; and an ion-exchange membrane disposed between the positive electrode cell and the negative electrode cell, wherein the catholyte solution and the anolyte solution each includes a non-aqueous solvent, a supporting electrolyte, and an electrolyte, and wherein the electrolyte includes a metal-ligand coordination compound, and at least one of the metal-ligand coordination compounds includes a ligand having an electron donating group.

18 Claims, 4 Drawing Sheets

(56) References Cited

U.S. PATENT DOCUMENTS

| | | |
|---|---|---|
| 7,270,911 B2 | 9/2007 | Clarke et al. |
| 2006/0063065 A1 | 3/2006 | Clarke et al. |
| 2011/0195283 A1 | 8/2011 | Sun et al. |
| 2012/0171531 A1* | 7/2012 | Park ............... B60L 11/005 429/70 |
| 2012/0171541 A1* | 7/2012 | Park ............... B60L 11/1879 429/107 |

FOREIGN PATENT DOCUMENTS

| | | |
|---|---|---|
| JP | 63114066 A | 5/1988 |
| JP | 2001085027 A | 3/2001 |
| KR | 1020110088881 A | 8/2011 |
| KR | 1020120078392 A | 7/2012 |
| KR | 1020130049077 A | 5/2013 |
| KR | 1020130088481 A | 8/2013 |
| KR | 1020130132107 A | 12/2013 |
| WO | 2010037138 A3 | 4/2010 |

OTHER PUBLICATIONS

Y-W D. Chen et al., Solution Redox Couples for Electrochemical Energy Storage: II . Colbalt(III)-Cobalt(II) Complexes with o-Phenanthroline and Related Ligands, J. Electrochem. Soc.: Electrochemical Science and Technology, vol. 129, No. 1, Jan. 1982, pp. 61-66.

Ludwig Joerissen et al. "Possible use of vanadium redox-flow batteries for energy storage in small grids and stand-alone photovoltaic systems", Journal of Power Sources 127 (2004) 98-104.

V-Fuel Company and Technology Information Sheet (2008) 14 pp.

\* cited by examiner

REDOX FLOW BATTERY

CROSS-REFERENCE TO RELATED APPLICATIONS

This application claims priority to and the benefit of Korean Patent Application No. 10-2012-0146622, filed on Dec. 14, 2012, and all the benefits accruing therefrom under 35 U.S.C. §119, the content of which is incorporated herein in its entirety by reference.

BACKGROUND

1. Field

The present disclosure relates to redox flow batteries, and more particularly, to redox flow batteries showing high energy densities.

2. Description of the Related Art

Generally, a secondary battery stores energy by transforming electrical energy into chemical energy through a charging process and uses energy by transforming the chemical energy into electrical energy.

Likewise, a redox flow battery (hereinafter, "RFB") uses energy through a charging and discharging process by transforming electrical energy into chemical energy or by transforming chemical energy into electrical energy. However, a unique aspect of the redox flow battery is that unlike a general secondary battery, an electrode active material that stores energy exists in a liquid form instead of a solid form. Accordingly, in a redox flow battery, the electrode active material is stored in a tank, and voltage of the battery may be increased through stacking unit cells.

In greater detail, a catholyte and an anolyte act as electrode active materials, and typically, a transition metal oxide exists in a liquid state, wherein the transition metal oxide is dissolved in a solvent. Hence, the catholyte and the anolyte are stored in the tank as a mixture of reduced and oxidized electrolytes.

Similar to a fuel cell, a cell generating electrical energy includes a structure of carbon electrode/membrane/carbon electrode. In such a cell, the catholyte and the anolyte supplied by pumps undergo an oxidation reduction reaction at the surfaces of each carbon electrode, generating an electromotive force corresponding to Gibbs free energy. The carbon electrode does not directly contribute to the reaction and only supports the oxidation/reduction reaction of active materials. The membrane does not directly contribute to the reaction; however, it performs a function of rapidly transporting charge carrier ions between the catholyte and the anolyte, thus preventing a positive electrode and a negative electrode from directly contacting each other, and most importantly, suppressing a crossover of active ions dissolved in the catholyte and the anolyte.

However, a conventional redox flow battery using an aqueous solvent has a disadvantage of low energy density caused by a low driving voltage as an operation potential is limited to the water decomposition potential. Accordingly, there is a continuous demand for a redox flow battery having a high energy density.

SUMMARY

Provided is a redox flow battery having a high energy density.

According to an aspect, there is provided a redox flow battery including:
a positive electrode cell including
  a positive electrode and
  a catholyte solution;
a negative electrode cell including
  a negative electrode and
  an anolyte solution; and
an ion-exchange membrane disposed between the positive electrode cell and the negative electrode cell,
wherein the catholyte solution and the anolyte solution each includes
  a non-aqueous solvent,
  a supporting electrolyte, and
  an electrolyte, and
wherein the electrolyte includes
  a metal-ligand coordination compound, and
  at least one of the metal-ligand coordination compounds includes a ligand having an electron donating group.

According to an embodiment, the electron donating group may be at least one selected from a hydroxyl group, a thiol group, an alkyl group, an alkoxy group, an alkylthio group, an aryl group, an aryloxy group, an arylthio group, an alkenyl group, an alkynyl group, an amide group, an ester group, and an amine group.

According to another embodiment, the electrolyte may further include a metal-ligand coordination compound including a ligand having an electron withdrawing group.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
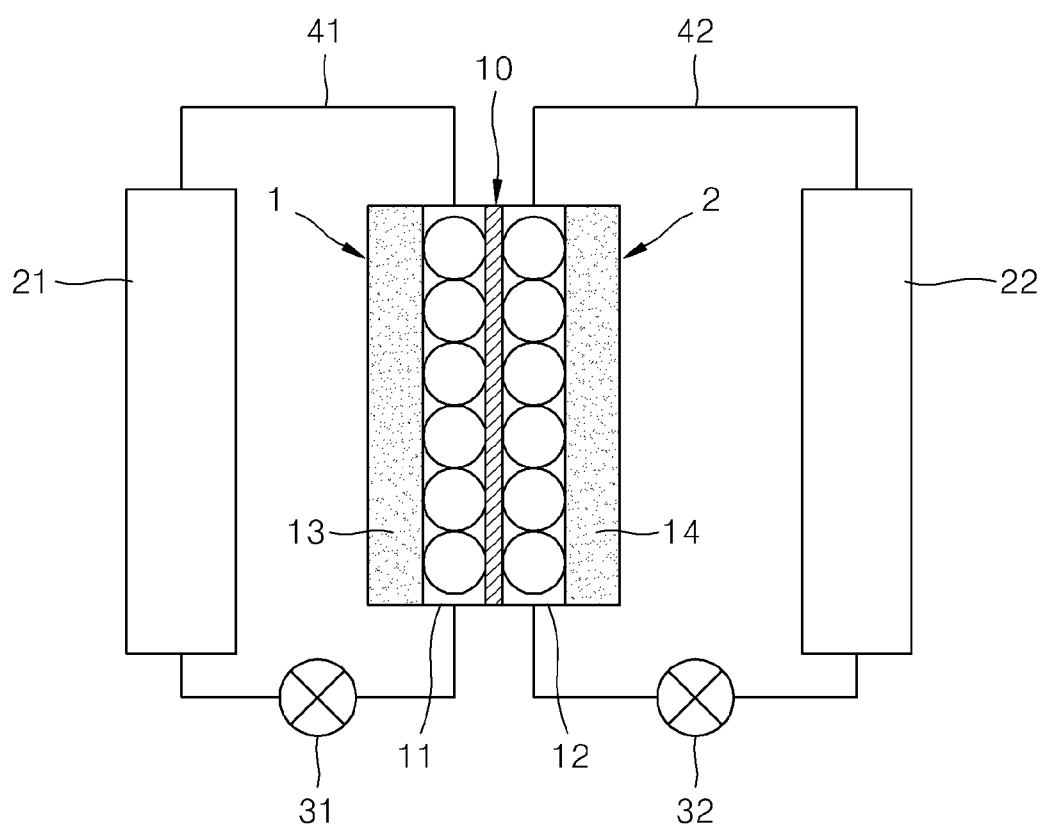
FIG. 1 is a schematic view of a redox flow battery according to an embodiment.
Figure 2A:
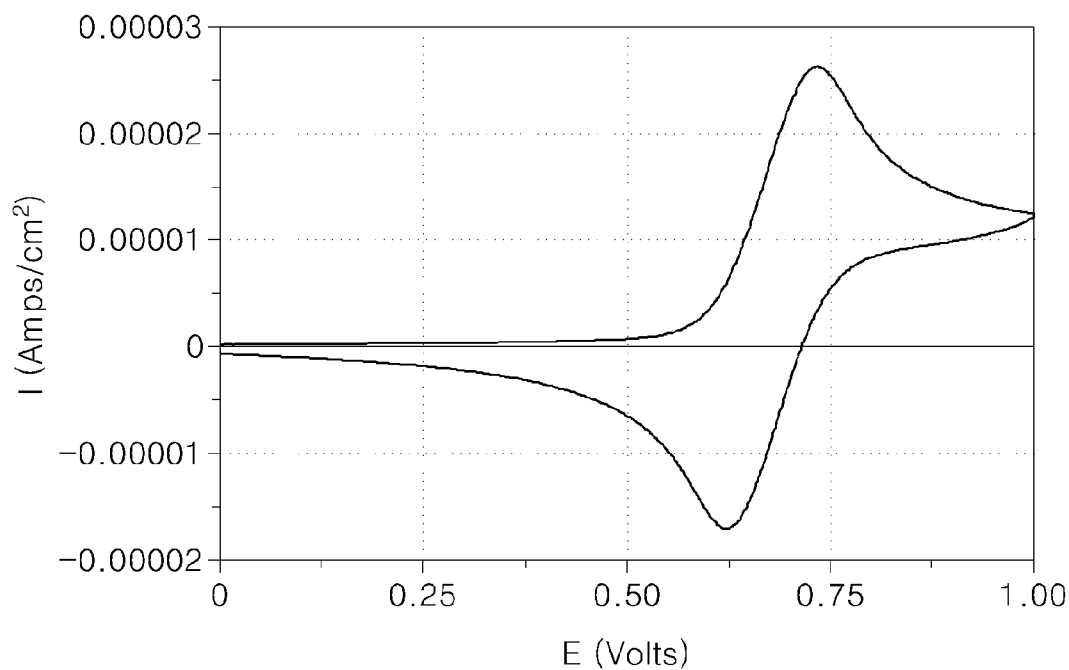
FIGS. 2A-2E are graphs of current density (amperes per square centimeter, Amps/cm$^2$) versus electric potential (volts, V) which are cyclic voltammetry graphs of organic electrolyte solutions including the electrolytes obtained in Preparation Example 1 to Preparation Example 3, Preparation Example 5, and Preparation Example 8.
Figure 2B:
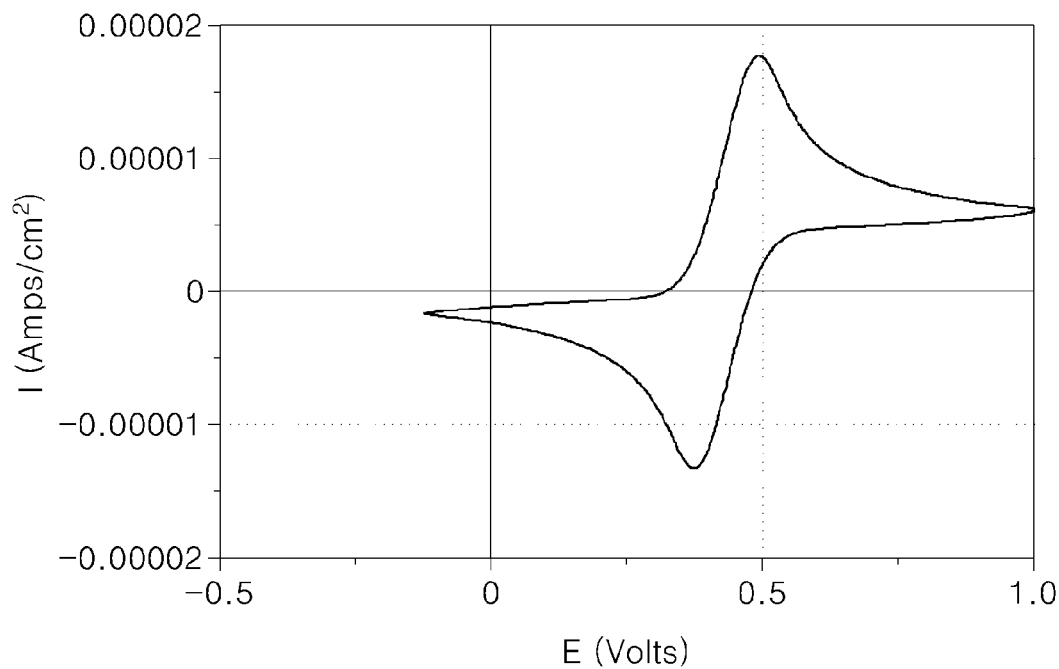
Figure 2C:
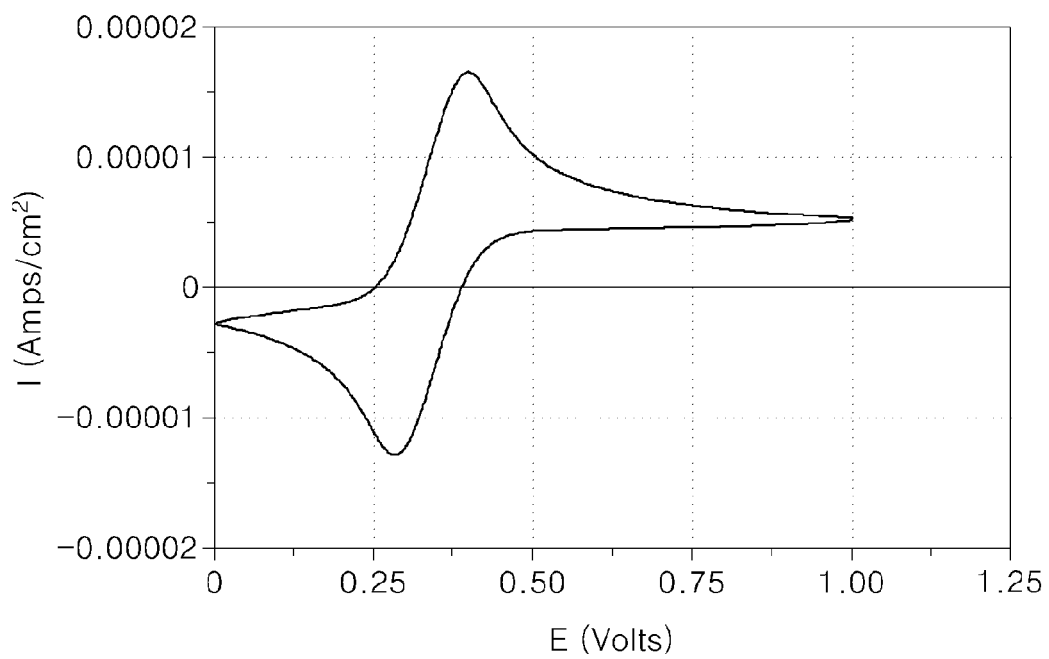
Figure 2D:
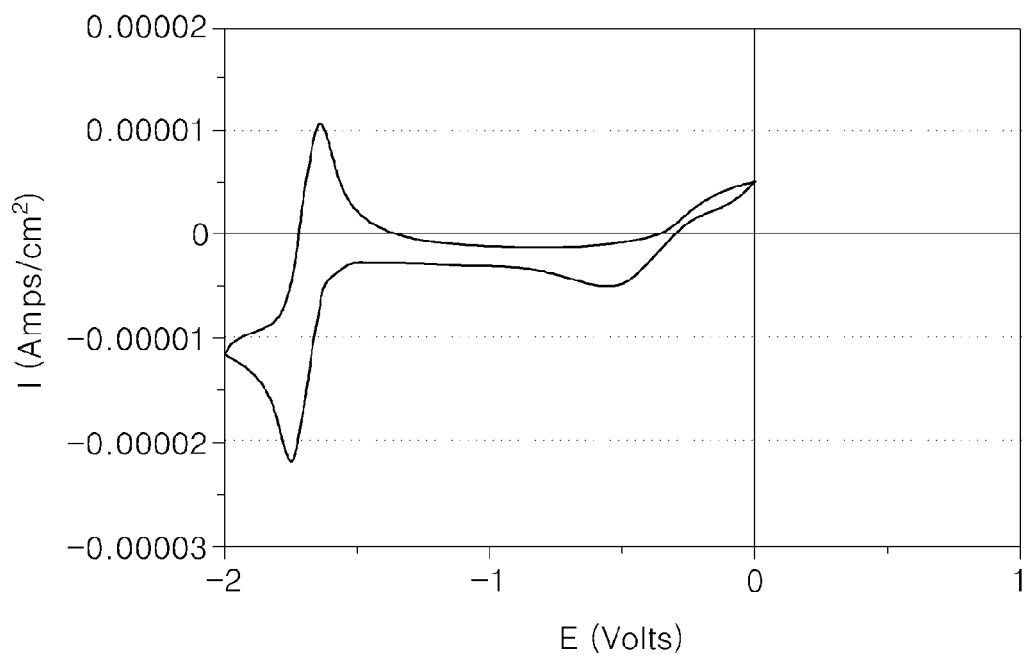
Figure 2E:
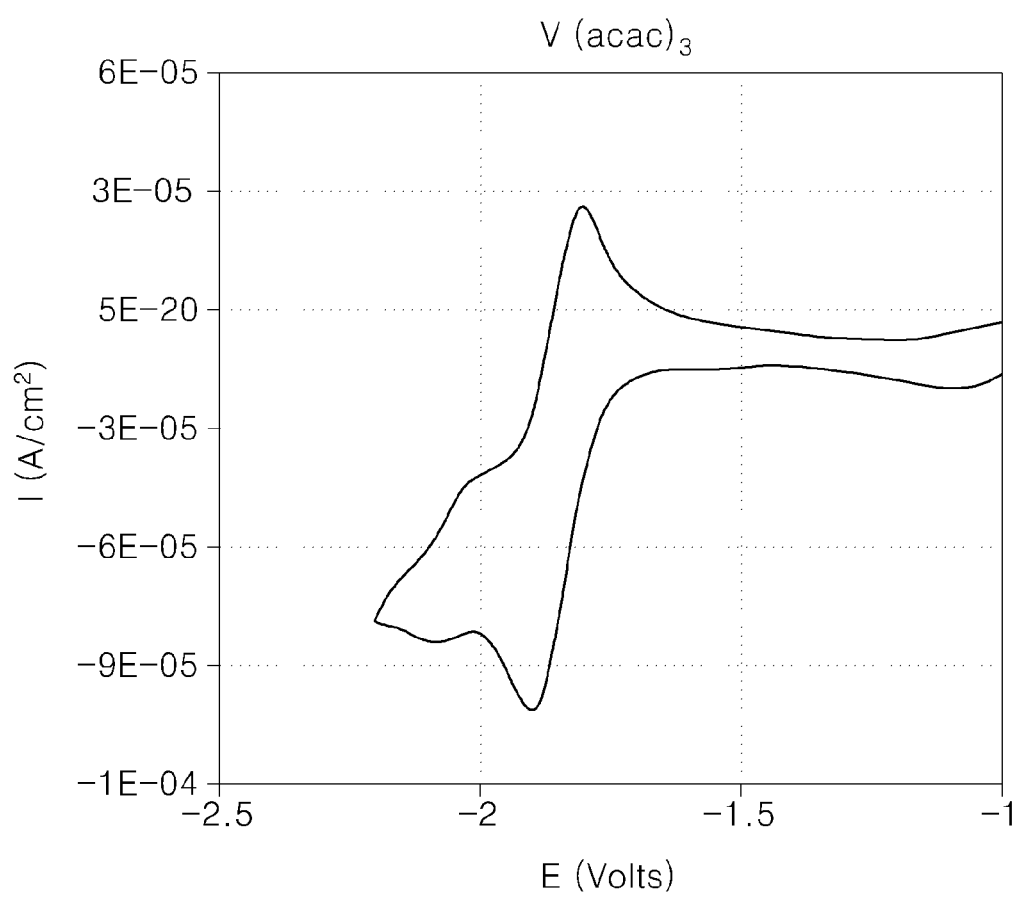

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Aliphatic" as used herein refers to a saturated or unsaturated, cyclic, linear, or branched hydrocarbon group or compound. An aliphatic ligand may be an alkyl, alkenyl, or alkynyl group, for example. Aliphatic ligands may include, for example, groups having from 1 to 21 carbon atoms, from 1 to 124 carbon atoms, or from 1 to 6 carbon atoms (C1-C6 alkyl).

"Aromatic" as used herein refers to an organic compound or group comprising at least one unsaturated cyclic group having delocalized pi electrons. The term encompasses both hydrocarbon aromatic compounds and heteroaromatic compounds. Aromatic ligands may include, for example, groups having from 3 to 21 carbon atoms, from 3 to 18 carbon atoms, or from 3 to 12 carbon atoms, or from 3 to 6 carbon atoms, depending on the presence and number of heteroatoms.

"Alkyl" as used herein refers to a monovalent group derived from a straight or branched chain saturated aliphatic hydrocarbon. Alkyl groups may include, for example, groups having from 1 to 14 carbon atoms (C1-C14 alkyl), and may include, for example, groups having from 1 to 6 carbon atoms (C1-C6 alkyl).

"Alkoxy" as used herein refers to an "alkyl-O", wherein "alkyl" is the same as defined above. Alkoxy groups may include, for example, groups having from 1 to 14 carbon atoms (C1-C14 alkoxy), and may include, for example, groups having from 1 to 6 carbon atoms (C1-C6 alkoxy).

"Alkylthio" as used herein refers to an "alkyl-S", wherein "alkyl" is the same as defined above. Alkylthio groups may include, for example, groups having from 1 to 14 carbon atoms (C1-C14 alkylthio), and may include, for example, groups having from 1 to 6 carbon atoms (C1-C6 alkylthio).

"Alkenyl" as used herein refers to a monovalent group derived from a straight or branched chain saturated aliphatic hydrocarbon, and having at least one double bond. Alkenyl groups may include, for example, groups having from 2 to 14 carbon atoms (C2-C14 alkenyl).

"Alkynyl" as used herein refers to a monovalent group derived from a straight or branched chain saturated aliphatic hydrocarbon, and having at least one triple bond. Alkynyl groups may include, for example, groups having from 2 to 14 carbon atoms (C2-C14 alkynyl).

"Aryl" as used herein refers to a monovalent group derived from an aromatic hydrocarbon containing at least one ring. Aryl groups may include, for example, groups having from 6 to 12 carbon atoms (C6-C12 aryl).

"Aryloxy" as used herein refers to an "aryl-O", wherein "aryl" is the same as defined above. Aryloxy groups may include, for example, groups having from 6 to 12 carbon atoms (C6-C12 aryloxy).

"Arylthio" as used herein refers to an "aryl-S", wherein "aryl" is the same as defined above. Arylthio groups may include, for example, groups having from 6 to 12 carbon atoms (C6-C12 arylthio).

"Haloalkyl" as used herein refers to an alkyl group including at least one iodine, bromine, chlorine, or fluorine atom.

"Heteroaliphatic" as used herein refers to a saturated or unsaturated, cyclic, linear, or branched hydrocarbon group or compound that includes as least one heteroatom (e.g., 1, 2, or 3) in the backbone. Heteroaliphatic ligands may include, for example, groups having from 1 to 21 carbon atoms, from 1 to 12 carbon atoms, or from 1 to 6 carbon atoms. The heteroatom(s) are generally independently selected from nitrogen (N), oxygen (O), P (phosphorus), and sulfur (S).

"Heteroaromatic" as used herein refers to a monovalent carbocycle that includes one or more aromatic rings, in which at least one ring member (e.g., 1, 2, or 3 ring members) that is a heteroatom. In a C3 to C30 heteroaromatic ligand, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), P (phosphorus), and sulfur (S).

At least one hydrogen atom of any of the foregoing groups may be substituted with a halogen atom, a C1-C6 alkyl group substituted with a halogen atom (for example, —CCF$_3$, —CHCF$_2$, —CH$_2$F, —CCl$_3$, and the like), a C1-C6 alkoxy group, a hydroxyl group (—OH), a nitro group (—NO$_2$), a cyano group (—CN), an amino group (—NRR', wherein R and R' are independently hydrogen or a C1-C6 alkyl group), an amido group (—C(=O)NRR', wherein R and R' are independently hydrogen or a C1-C6 alkyl group), a hydrazine group (—NHNRR', wherein R and R' are independently hydrogen or a C1-C6 alkyl group), a hydrazone group (—CR=NHNR'R'', wherein R, R' and R'' are independently hydrogen or a C1-C6 alkyl group), an azido group (—N$_3$), an amidino group (—C(=NH)NRR' wherein R and R' are independently hydrogen or a C1-C6 alkyl group), a carboxyl group (—CO$_2$H) or a salt thereof, a sulfonyl group, a sulfamoyl group, a sulfonic acid group (—SO$_3$H) or a salt thereof, a phosphoric acid group (—P(=O)(OH)$_2$) or a salt thereof, a C1-C6 alkyl group, a C2-C14 alkenyl group, a C2-C14 alkynyl group, or a C6-C12 aryl group.

Hereinafter, a redox flow battery will be described in greater detail according to one or more embodiments.

FIG. 1 is a schematic view of a redox flow battery according to an embodiment.

As illustrated in FIG. 1, the redox flow battery separates into a positive electrode cell 1 and a negative electrode cell 2 by an ion-exchange membrane 10. The positive electrode cell 1 and the negative electrode cell 2 respectively include a positive electrode 13 and a negative electrode 14. The positive electrode cell 1 is connected to a catholyte solution tank 21 for supplying and releasing a catholyte solution 11 through a pipe 41. Likewise, the negative electrode cell 2 is connected to an anolyte solution tank 22 for supplying and releasing an anolyte solution 12 through a pipe 42. The catholyte solution 11 and the anolyte solution 12 circulate through pumps 31 and 32, respectively, and charging/discharging occurs according to the change of the oxidation states of ions in the positive electrode 13 and the negative electrode 14.

The ion-exchange membrane 10 prevents active material ions of the catholyte solution 11 and the anolyte solution 12 from being mixed, and only allows transmission of charge carrier ions of a supporting electrolyte.

A redox flow battery according to an embodiment includes
a positive electrode cell including
a positive electrode and
a catholyte solution;
a negative electrode cell including
a negative electrode and
an anolyte solution, and
an ion-exchange membrane disposed between the positive electrode cell and the negative electrode cell,
wherein the catholyte solution and the anolyte solution each include
a non-aqueous solvent,
a supporting electrolyte, and
an electrolyte, and
wherein the electrolyte includes
a metal-ligand coordination compound, and
at least one of the metal-ligand coordination compound includes a ligand having an electron donating group.

The redox flow battery discharges by flowing an electric current by connecting to an external circuit including an electric load. Conversely, the redox flow battery charges by the inflow of electric current by connecting an external power supply to the battery.

Generally, the catholyte is charged when a redox couple is oxidized to a higher oxidation state from two oxidation states, and discharged when the redox couple is reduced to a lower oxidation state from the two oxidation states. Conversely, the anolyte is charged when the redox couple is reduced to a lower oxidation state from the two oxidation states, and is discharged when the redox couple is oxidized to a higher oxidation state from the two oxidation states:

Positive Electrode

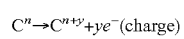

$$C^n \rightarrow C^{n+y} + ye^- \text{(charge)}$$

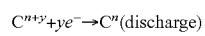

$$C^{n+y} + ye^- \rightarrow C^n \text{(discharge)}$$

(C: catholyte)
Negative Electrode

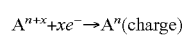

$$A^{n+x} + xe^- \rightarrow A^n \text{(charge)}$$

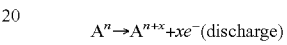

$$A^n \rightarrow A^{n+x} + xe^- \text{(discharge)}$$

(A: anolyte)

As stated above, conventional redox flow battery using an aqueous solvent has a disadvantage of low energy density due to a low driving voltage as an operation potential is limited to the water decomposition potential. Such a problem may be solved by using a non-aqueous solvent; for example, an organic solvent.

According to an embodiment, the catholyte solution and the anolyte solution each include an electrolyte including metal-ligand coordination compounds, and as at least one of the metal-ligand coordination compounds includes an electron donating group, a redox flow battery having a high charge/discharge efficiency and a high energy density may be obtained.

A central metal of the metal-ligand coordination compound may be at least one metal selected from nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

The ligand in the metal-ligand coordination compound may be, but is not limited to, an aromatic ligand or an aliphatic ligand, and the ligand may be a nitrogen-containing heteroaromatic ligand (having, e.g., 3 to 21 carbon atoms), a heteroaliphatic ligand (having, e.g. 1 to 12 carbon atoms), or a combination thereof. For example, the ligand may be at least one selected from a substituted or unsubstituted dipyridyl, a substituted or unsubstituted terpyridyl, a substituted or unsubstituted phenanthroline, a substituted or unsubstituted ethylenediamine, a substituted or unsubstituted propylenediamine, and a substituted or unsubstituted N-heterocyclic carbene ("NHC"). The NHC may be, for example, at least one selected from 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole, or 1-ethyl-3-methylimidazole.

The metal-ligand coordination compound may undergo a reversible oxidation/reduction reaction.

The electrolyte may further include a metal-ligand coordination compound including an electron donating group. The electrolyte may further include a metal-ligand coordination compound including an electron withdrawing group.

When the metal-ligand coordination compound further includes a ligand including an electron withdrawing group, the electron withdrawing group may minimize an electron cloud of the central metal of the metal-ligand coordination compound and increase an open circuit voltage ("OCV") value of the battery.

The electron donating group and the electron withdrawing group may be selected through a general experiment. A representative electron donating group may be at least one selected from a hydroxyl group (—OH), a thiol group (—SH), an alkyl group (having, e.g, 1 to 12 carbon atoms), an alkoxy group (having, e.g, 1 to 12 carbon atoms), an alkylthio group (having, e.g, 1 to 12 carbon atoms), an aryl group (having, e.g, 1 to 18 carbon atoms), an aryloxy group, an arylthio group (having, e.g, 1 to 12 or 1 to 6 carbon atoms), an alkenyl group (having, e.g, 2 to 18 carbon atoms), an alkynyl group (having, e.g, 2 to 12 carbon atoms), an amide group (having, e.g, 1 to 12 carbon atoms), an ester group (having, e.g, 2 to 12 carbon atoms), and an amine group (having, e.g, 1 to 12 carbon atoms). For example, the electron donating group may be at least one selected from an alkyl group having 1 to 6 carbon atoms, an alkoxy group having 1 to 6 carbon atoms (—OR), an alkylthio group having 1 to 6 carbon atoms (—SR), an aryl group having 6 to 12 carbon atoms, an alkenyl group having 2 to 14 carbon atoms, an ester group (—O(C=O)R), an amide group (—NH(C=O)R), and an amine group (—NR$_2$). In an embodiment, the electron donating group may be —CH=CH$_2$. Here, R may be an alkyl group having 1 to 6 carbon atoms or an aryl group having 6 to 12 carbon atoms. At least one hydrogen atom of the alkyl group, the alkoxy group, the alkylthio group, the aryl group, or the alkenyl group may be substituted with an alkyl group, an alkoxy group, a heteroalkyl group, or a halogen atom.

In a greater detail, the electron donating group may be at least one selected from a methyl group (—CH$_3$), a hydroxyl group (—OH), an acetoxy group (—O(C=O)CH$_3$), a phenyl group (—C$_6$H$_5$), a methoxy group (—OCH$_3$), a methylthio group (—SCH$_3$), an alkylcarboxy group (—O(C=O)R, wherein R is an alkyl group having 1 to 6 carbon atoms), an alkylcarbamino group (—NH(C=O)R, wherein R is an alkyl group having 1 to 6 carbon atoms), an amino group (—NR$_2$, wherein R is an alkyl group having 1 to 6 carbon atoms), and an acetamide group (—NH(C=O)CH$_3$). In an embodiment, the electron donating group may be an acetoxy group (—O(C=O)CH$_3$) or an acetamide group (—NH(C=O)CH$_3$).

The electron withdrawing group may be a suitably substituted aryl group, a haloalkyl group, —N-(alkyl)$_3^+$, —N-(alkyl)$_2$H$^+$, —N-(alkyl)H$_2^+$, —S-(alkyl)$_2^+$, —NH$_3^+$, —NO$_2$, —SO-(alkyl), —SO-(aryl), —SO$_2$-(alkyl), —SO$_2$-(aryl), —P(O)(OH)$_2$, —P(O)(OH)(O-alkyl), —P(O)(OH)(O-aryl), —P(O)(O-alkyl)$_2$, —P(O)(O-aryl)$_2$, —P(O)(O-alkyl)(O-aryl), —C(O)OH, a cyclopentadienyl group, —C(O)O-(alkyl), —C(O)O-(aryl), —C(O)NH-(alkyl), —C(O)NH-(aryl), —C(O)-(alkyl), —C(O)-(aryl), —CHO, —CN, a heterocyclic group, a halogen atom, and an alkenyl group. For example, the electron withdrawing group may be —CF$_3$, —CH=CH$_2$, a chlorophenyl group, or a bromophenyl group. For example, the electron withdrawing group may be at least one selected from a haloalkyl group, an alkenyl group, a halogen atom, a nitrile group (—CN), a nitro group (—NO$_2$), and a phenyl group.

The metal-ligand coordination compound including the ligand having the electron donating group may be included in the anolyte solution. In this case, the electrolyte included in the catholyte solution may include a metal-ligand coordination compound as defined above or the metal-ligand coordination compound including the ligand having the electron withdrawing group.

Examples of the metal-ligand coordination compounds may include at least one selected from compounds below:

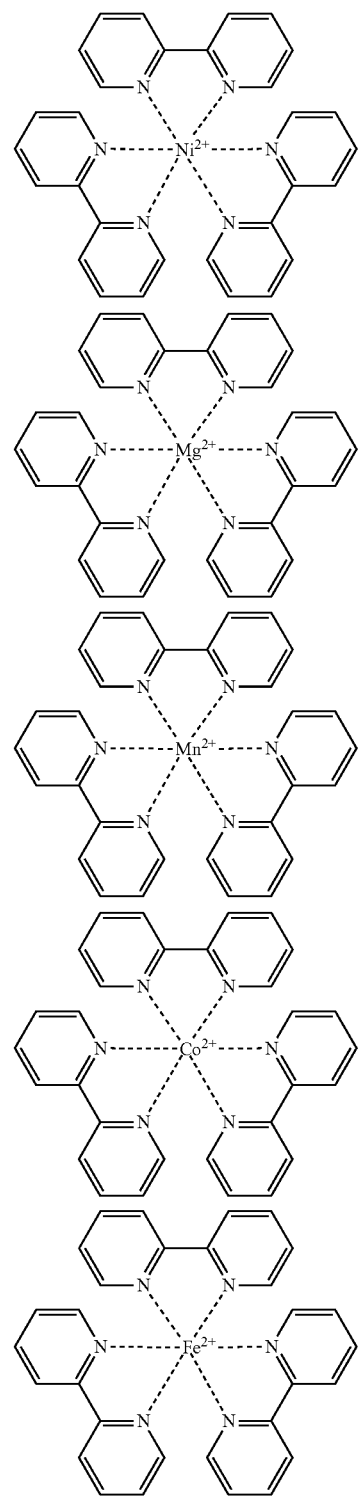

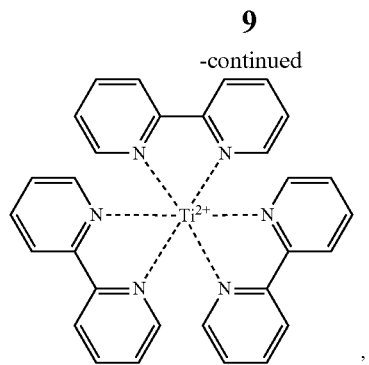
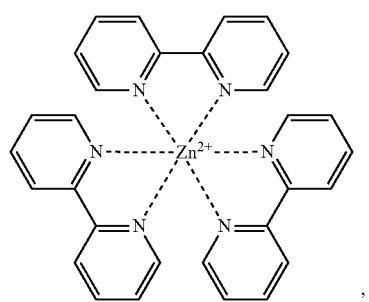
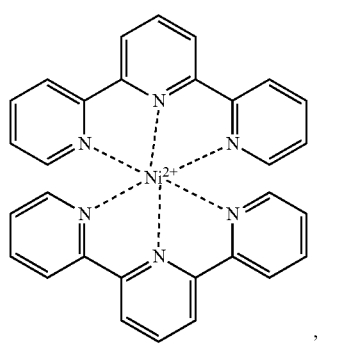
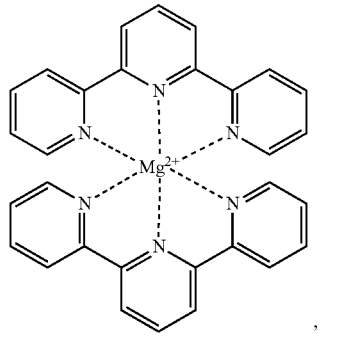
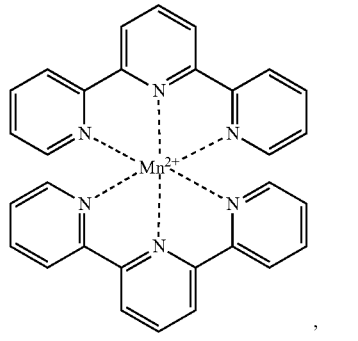
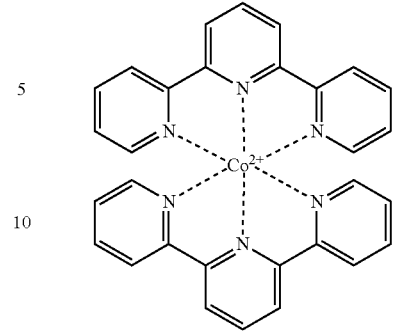
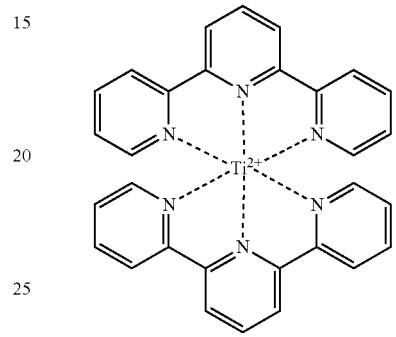
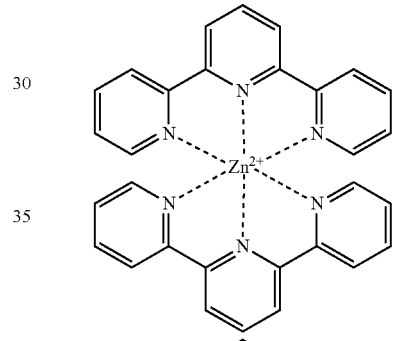
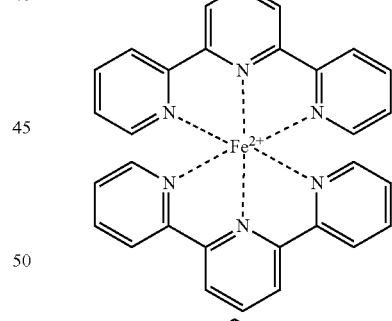
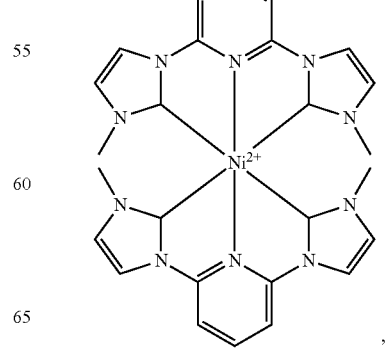

-continued
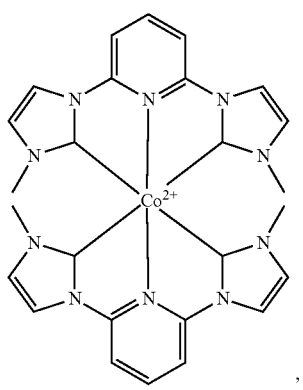
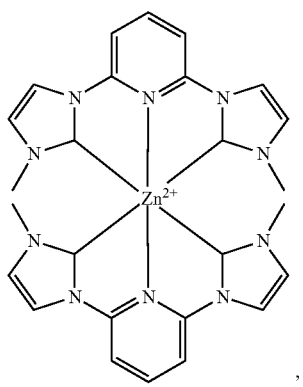
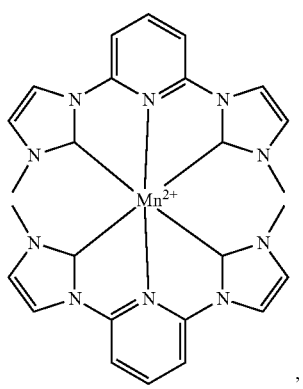
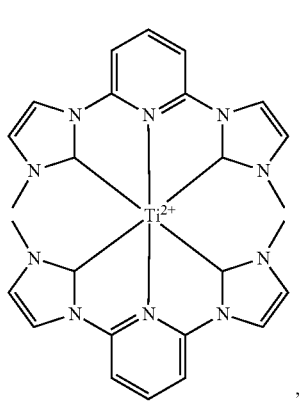
-continued
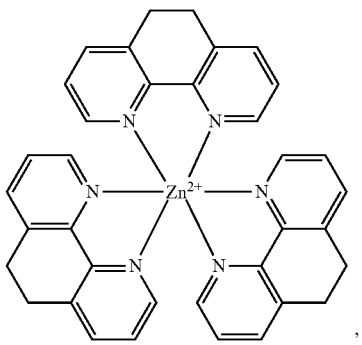
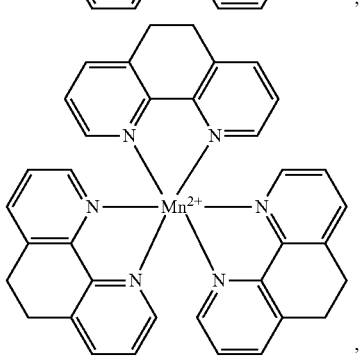
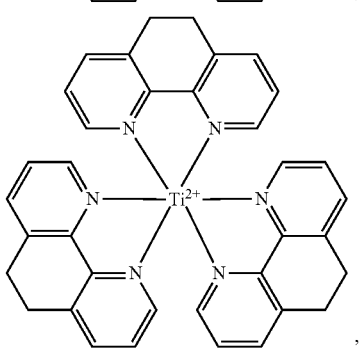
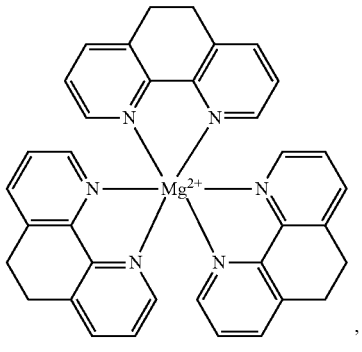
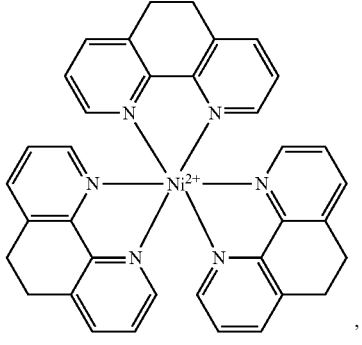

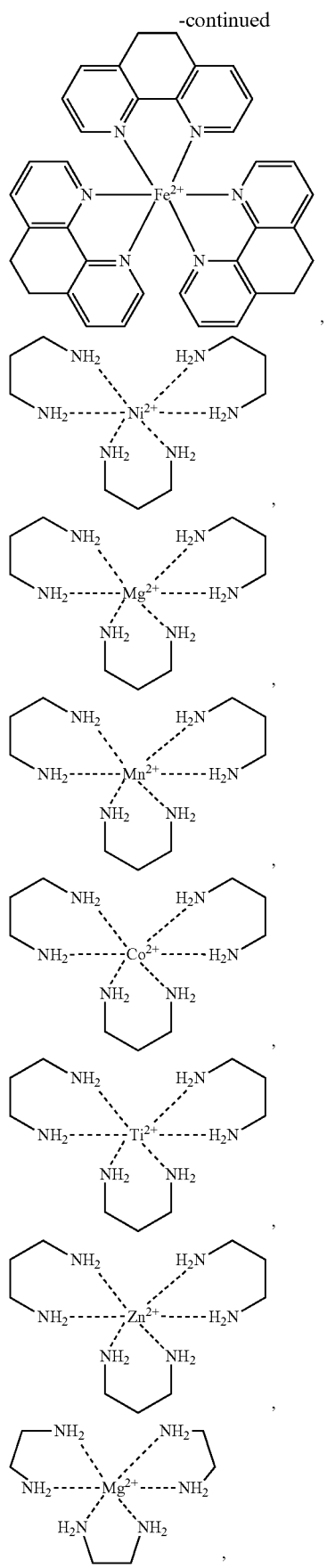
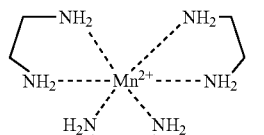
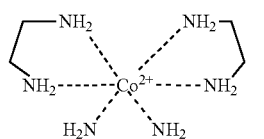
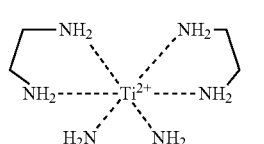
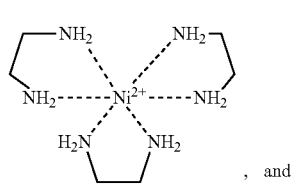
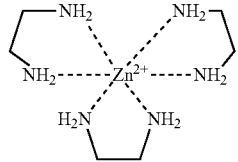
Examples of the metal-ligand coordination compounds including the ligand having the electron donating group may include at least one selected from the compounds below:
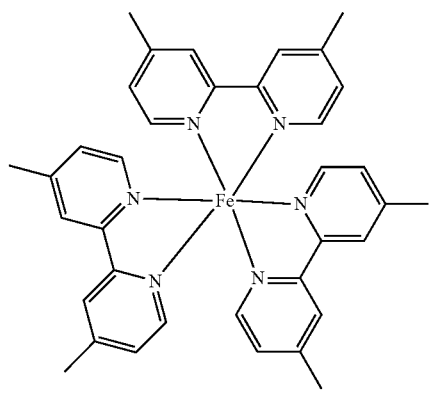

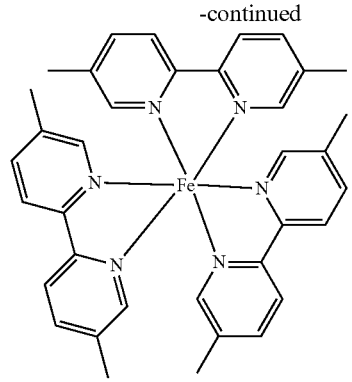
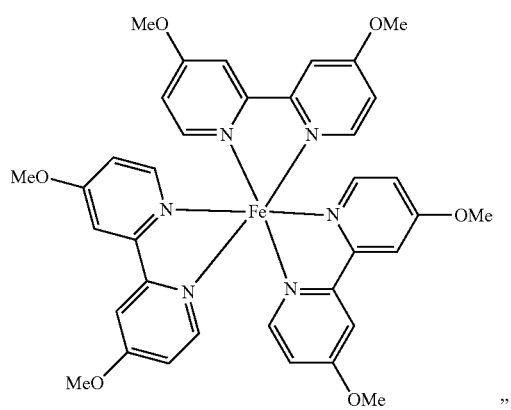
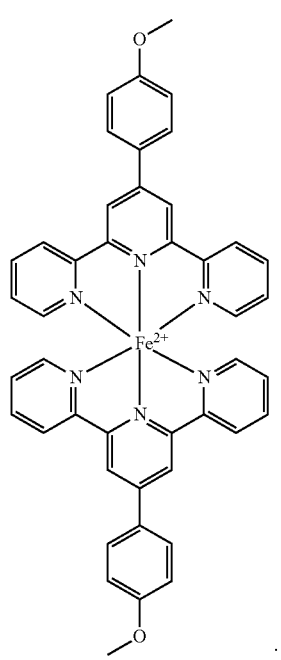
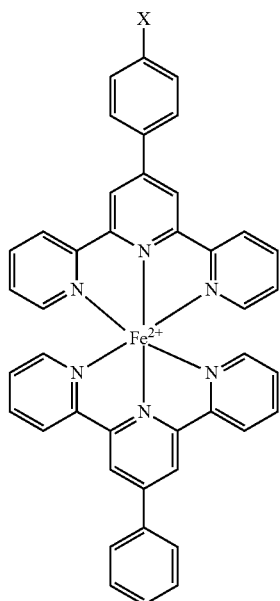
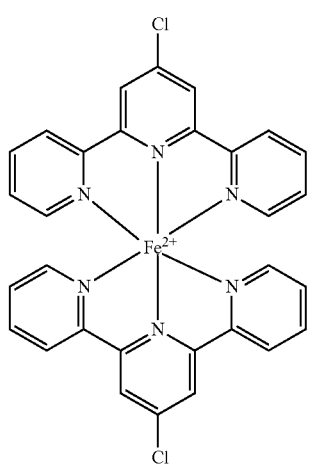
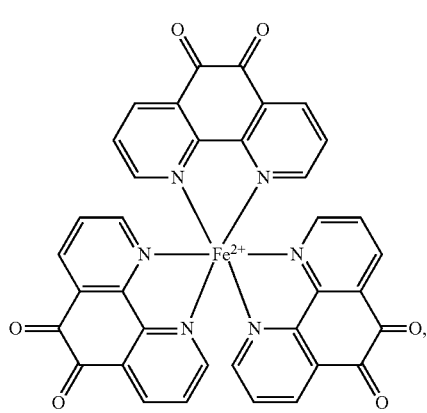
Examples of the metal-ligand coordination compounds including an aromatic ligand having the electron withdrawing group may include at least one selected from compounds below:

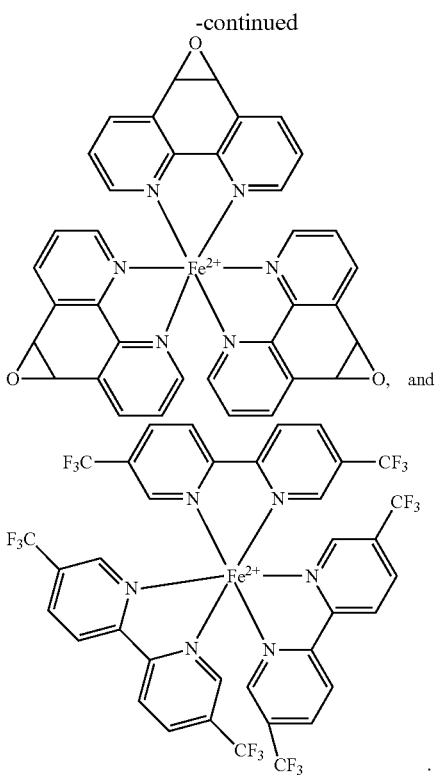

In Formulas above, X may be OH, H, Br, or Cl. The substituent X may be substituted at the 3,3' or 5,5' position.

The electrolyte may include a metal-ligand coordination compound having $BF_4^-$, $PF_6^-$, $CF_3SO_3^-$, or $(CF_3SO_2)_2N^-$ as a counter ion.

The non-aqueous solvent included in the electrolyte solution, according to an embodiment, may be at least one selected from diethyl carbonate, dimethyl carbonate, butylene carbonate, methylethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethylformamide ("DMF"), dimethylsulfoxide ("DMSO"), 1,4-dioxane, 1,2-dimethoxyethane ("DME"), sulfolane, 1,2-dichloroethane, chlorobenzene, nitrobenzene, dimethyl ether, diethyl ether, acetonitrile ("ACN"), γ-butyrolactone ("GBL"), propylene carbonate ("PC"), ethylene carbonate ("EC"), N-methyl-2-pyrrolidone ("NMP"), fluoroethylene carbonate, N,N-dimethylacetamide ("DMA"), and the like. A combination comprising at least one of the foregoing solvents can be used. Any suitable material available for these purposes in the art may be used.

The redox flow battery may further include a catholyte tank and an anolyte tank, wherein the catholyte tank is fluid connected to the positive electrode cell, and the anolyte tank is fluid connected to the negative electrode cell.

As the ion-exchange membrane, an ion-exchange membrane used for the conventional redox flow battery may be used. An exchange membrane may be obtained by sulfonating a styrene-divinylbenzene copolymer, by introducing a sulfonate group into a copolymer of tetrafluoroethylene and perfluorosulfonylethoxyvinylether, formed of a copolymer of tetrafluoroethylene and perfluorovinylether having a carboxyl group as a side chain, or by introducing a sulfonate group into an aromatic polysulfone copolymer.

When the conventional cation exchange membrane is used, a salt including cations such as $Na^+$, $Li^+$, and $H^+$ is used as a source of a charge carrier. However, solubility of such salts decreases in an organic solvent, so when a small amount of water is added to the organic solvent to increase the solubility of the salt, the ligand becomes unstable, and may result in an incomplete reversibility of the oxidation/reduction reaction. In contrast, when the anion exchange membrane is used, a salt having high aqueous solubility may be added even in the organic solvent, completely removing water, preventing a decomposition of the ligand, and making the oxidation/reduction reaction completely reversible, thereby improving cycle characteristics and voltage characteristics of the battery.

The use of the anion exchange membrane is advantageous in that the membrane prevents the catholyte and the anolyte being mixed, enables counter negative ions of the metal-ligand coordination compound to serve as a charge carrier, secures a sufficient concentration of the charge carrier even with a small amount of the supporting electrolyte, and inhibits a movement of an active material that is a positive ion, thereby achieving a high charge/discharge efficiency and a high voltage efficiency.

The anion exchange membrane may be obtained as a product of aminating copolymer of styrene-divinylbenzene including a chloromethyl group, as a product of substituting a copolymer of vinylpyridine-divinylbenzene with a quaternary pyridinium salt, or as a product of aminating an aromatic polysulfone copolymer including a chloromethyl group.

Commercialized anion exchange membranes include NEOSEPTA®-AMEX, NEOSEPTA®-AHA and NEOSEPTA®-ACS from ASTOM, Cybron ionan MA3475 from LANXESS, FAS, FAB, FAN, FAA, and FAD from FuMatech, PC 100D, PC 200D, and PC-SA from Polymerchemie Altmeier ("PCA").

The supporting electrolyte does not directly contribute to a reaction but plays a role of a charge balance between the catholyte and the anolyte.

As the supporting electrolyte, at least one of $LiBF_4$, $LiPF_6$, $LiClO_4$, $LiCF_3SO_3$, $Li(CF_3SO_2)_2N$, $LiSbF_6$, $LiAsF_6$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, triethylamine tetrafluorborate ("TEABF$_4$"), tributylamine tetrafluorborate ("TBABF$_4$"), $NaBF_4$, $NaPF_6$, trimethylsulfonylchloride, and $(NH_4)_2SO_4$ may be used. A combination comprising at least one of the foregoing supporting electrolytes can be used. Any suitable material available for these purposes in the art may be used. When the supporting electrolyte is used instead of a conventional sulfuric acid, the electrolyte solution may be prepared by using a non-aqueous solvent.

As the charge carrier passing through the ion-exchange membrane, $Li^+$, $Na^+$, $Cl^-$, $Br^-$, $I^-$, $SO_4^-$, $BF_4^-$, $PF_6^-$, $ClO_4^-$, $CF_3SO_3^-$, $(CF_3SO_2)_2N^-$, or bis(trifluoromethylsulfonyl)imide ("$(TFSI)_2^-$") may be used.

The redox flow battery is suitable for cell phones, portable computers, and the like, and suitable even for uses requiring a high capacity and a high output power such as electric vehicles, and may couple to conventional internal combustion engines, fuel cells, supercapacitors, and the like to be used in hybrid vehicles. Also, the redox flow battery may be used for all other purposes requiring a high output power and a high voltage.

Hereinafter, one or more embodiments are described in greater detail using Examples and Comparative Examples; however, the present disclosure is not limited thereto.

Preparation Example 1: $Fe^{2+}$-(bpy)$_3$[TFSI]$_2$

In a 100 ml round bottom flask, 21.63 g (29.88 mmol) of Fe(TFSI)$_2$.6H$_2$O was added; then, 50 ml of ethanol was added, and the flask was agitated for 20 minutes until a Fe(TFSI)$_2$.6H$_2$O solution was formed.

In another 100 ml round bottom flask, 14 g (89.64 mmol) of bipyridine was added; then, 80 ml of ethanol was added, and the flask was agitated for 10 minutes until a bipyridine solution was formed.

In the Fe(TFSI)$_2$.6H$_2$O solution, the bipyridine solution was gradually added and agitated for three hours at room temperature until a mixture solution gradually became red. A resultant product was filtered, washed three times with 150 ml of water and ethanol, dried in the air, and then dried in a vacuum oven to obtain 16.632 g (79.7%) of a dark red solid.

Preparation Example 2: $Fe^{2+}$-(4,4'-diMe-bpy)$_3$[TFSI]$_2$

In a 100 ml round bottom flask, 21.63 g (29.88 mmol) of Fe(TFSI)$_2$.6H$_2$O was added; then, 50 ml of ethanol was added, and the flask was agitated for 20 minutes until a Fe(TFSI)$_2$.6H$_2$O solution was formed.

In another 100 ml round bottom flask, 16.5 g (89.64 mmol) of 4,4'-dimethylbipyridine was added, then 80 ml of ethanol was added, and the flask was agitated for 10 minutes until a 4,4'-dimethylbipyridine solution was formed.

In the Fe(TFSI)$_2$.6H$_2$O solution, the 4,4'-dimethylbipyridine solution was gradually added and agitated for three hours at room temperature until a mixture solution gradually became red. A resultant product was filtered, washed three times with 150 ml of water and ethanol, dried in the air, and then dried in a vacuum oven to obtain 16.632 g (79.7%) of a dark red solid.

Preparation Example 3: $Fe^{2+}$-(4,4'-diMethoxy-bpy)$_3$[TFSI]$_2$

In a 100 ml round bottom flask, 21.63 g (29.88 mmol) of Fe(TFSI)$_2$.6H$_2$O was added; then, 50 ml of ethanol was added, and the flask was agitated for 20 minutes until a Fe(TFSI)$_2$.6H$_2$O solution was formed.

In another 100 ml round bottom flask, 19.4 g (89.64 mmol) of 4,4'-dimethoxybipyridine was added, then 80 ml of ethanol was added, and the flask was agitated for 10 minutes until a 4,4'-dimethoxybipyridine solution was formed.

In the Fe(TFSI)$_2$.6H$_2$O solution, the 4,4'-dimethoxybipyridine solution was gradually added and agitated for three hours at room temperature until a mixture solution gradually became red. A resultant product was filtered, washed three times with 150 ml of water and ethanol, dried in the air, and then dried in a vacuum oven to obtain 16.632 g (79.7%) of a dark red solid.

Preparation Example 4: $Co^{2+}$-(4,4'-diMe-bpy)$_3$[TFSI]$_2$

In a 100 ml round bottom flask, 21.72 g (29.88 mmol) of Co(TFSI)$_2$.6H$_2$O was added; then, 50 ml of ethanol was added, and the flask was agitated for 20 minutes until a Co(TFSI)$_2$.6H$_2$O solution was formed.

In another 100 ml round bottom flask, 16.5 g (89.64 mmol) of 4,4'-dimethylbipyridine was added, then 80 ml of ethanol was added, and the flask was agitated for 10 minutes until a 4,4'-dimethylbipyridine solution was formed.

In the Co(TFSI)$_2$.6H$_2$O solution, the 4,4'-dimethylbipyridine solution was gradually added and agitated for three hours at room temperature until a mixture solution gradually became red. A resultant product was filtered, washed three times with 150 ml of water and ethanol, naturally dried, and dried in a vacuum oven to obtain 16.632 g (79.7%) of a dark red solid.

Preparation Example 5: $Co^{2+}$-(4,4'-diMethoxy-bpy)$_3$[TFSI]$_2$

In a 100 ml round bottom flask, 21.72 g (29.88 mmol) of Co(TFSI)$_2$.6H$_2$O was added; then, 50 ml of ethanol was added, and the flask was agitated for 20 minutes until a Co(TFSI)$_2$.6H$_2$O solution was formed.

In another 100 ml round bottom flask, 19.4 g (89.64 mmol) of 4,4'-dimethoxybipyridine was added, then 80 ml of ethanol was added, and the flask was agitated for 10 minutes until a 4,4'-dimethoxybipyridine solution was formed.

In the Co(TFSI)$_2$.6H$_2$O solution, the 4,4'-dimethoxybipyridine solution was gradually added and agitated for three hours at room temperature until a mixture solution gradually became red. A resultant product was filtered, washed three times with 150 ml of water and ethanol, dried in the air, and then dried in a vacuum oven to obtain 16.632 g (79.7%) of a dark red solid.

Preparation Example 6: $Fe^{2+}$-(5,5'-diCl-bpy)$_3$[TFSI]$_2$

In a 100 ml round bottom flask, 15.24 g (29.88 mmol) of Fe(TFSI)$_2$.6H$_2$O was added; then, 50 ml of ethanol was added, and the flask was agitated for 20 minutes until a Fe(TFSI)$_2$.6H$_2$O solution was formed.

In another 100 ml round bottom flask, 14 g (89.64 mmol) of 5,5'-dichlorobipyridine was added, then 80 ml of ethanol was added, and the flask was agitated for 10 minutes until a 5,5'-dichlorobipyridine solution was formed.

In the Fe(TFSI)$_2$.6H$_2$O solution, the 5,5'-dichlorobipyridine solution was gradually added and agitated for three hours at room temperature until a mixture solution gradually became red. A resultant product was filtered, washed three times with 150 ml of water and ethanol, naturally dried, and dried in a vacuum oven to obtain 16.632 g (79.7%) of a dark red solid.

Preparation Example 7: $Fe^{2+}$-(5,5'-diCF$_3$-bpy)$_3$[TFSI]$_2$

In a 100 ml round bottom flask, 21.63 g (29.88 mmol) of Fe(TFSI)$_2$.6H$_2$O was added; then, 50 ml of ethanol was added, and the flask was agitated for 20 minutes until a Fe(BF$_4$)$_2$.6H$_2$O solution was formed.

In another 100 ml round bottom flask, 26.19 g (89.64 mmol) of 5,5'-ditrifluoromethylbipyridine was added, then 80 ml of ethanol was added, and the flask was agitated for 10 minutes until a 5,5'-ditrifluoromethylbipyridine was formed.

In the Fe(TFSI)$_2$.6H$_2$O solution, the 5,5'-ditrifluoromethylbipyridine solution was gradually added and agitated for three hours at room temperature until a mixture solution gradually became red. A resultant product was filtered, washed three times with 150 ml of water and ethanol, dried in the air, and then dried in a vacuum oven to obtain 16.632 g (79.7%) of a dark red solid.

Preparation Example 8: $V^{3+}$-$[acac]_3$$[TFSI]_2$ $V^{3+}$-$[acac]_3$$[BF4]_2$ was prepared by mixing vanadium (III) acetylacetonate purchased from Aldrich and $TEABF_4$.

Cyclic Voltammetry

Changes in electric current values according to changes in potential during 100 cycles was measured by using the electrolyte obtained in Preparation Examples 1 to 8 at a scan rate of 10 millivolts per second ("mV/s") with a scan range of about 0.2 V to about 1.5 V for $Fe(bpy)_3(TFSI)_2$, about 0.2 V to about 1.0 V for $Fe(4,4'-diMe-bpy)_3(TFSI)_2$, about 2.1 V to about 0 V for $Fe(4,4'-diMethoxy-bpy)_3(TFSI)_2$, about 2.0 V to about 0 V for $Co(4,4'-diMe-bpy)_3(TFSI)_2$, about 2.0 V to about 0 V for $Co(4,4'-diMethoxy-bpy)_3(TFSI)_2$, about 0.2 V to about 1.0 V for $Fe(5,5'-diCl)-bpy)_3(TFSI)_2$, about 0.2 V to about 1.0 V for $Fe(5,5'-diCF_3)-bpy)_3(TFSI)_2$, about −2.5 V to about 1.0 V for $V(acac)_3(TFSI)_2$. In a cell used to measure a cyclic voltammetry curve, an $Ag/Ag^+$ electrode obtained by 0.3 M of $AgNO_3$ using acetonitrile as a solvent was used as a reference electrode, and a carbon felt was used as a working electrode and platinum was used as a counter electrode.

A result of the test above is shown in FIG. 2A through 2E. In FIG. 2A through 2E correspond to Preparation Example 1 to Preparation Example 3, Preparation Example 5, and Preparation Example 8, respectively.

As shown in FIG. 2A through 2E, a reversible oxidation/reduction peak of the electrolyte including the metal-ligand coordination compound, according to an embodiment, was observed.

Example 1

0.2 M of $Fe(bpy)_3$ TFSI was dissolved in 5 mL of propylene carbonate to prepare a catholyte solution, 0.2 M of $Co(4,4'-diMe-bpy)_3$ TFSI was dissolved in 5 mL of propylene carbonate to prepare an anolyte solution and charging was started. As a supporting electrolyte for each, $TEABF_4$ salt was dissolved in the propylene carbonate.

An electrode prepared by heat treating a carbon felt (Nippon Graphite, GF20-3, t=3 mm, A=5×5 $cm^2$) in an air environment at a temperature of 500° C. for five hours was used, and a non-flow type battery was prepared and evaluated as follows: as an ion-exchange membrane, Na conductive Nafion® membrane was used (product name: Nafion® 117, manufacturer: DuPont).

After placing a nut integrated end plate on a bottom, an insulator, a current collector, and a bipolar plate were laminated on the end plate. After cutting a 5×5 $cm^2$ square carbon felt electrode into ½, the rectangular carbon felt electrodes were inserted into a concave surface of the bipolar plate.

In each of the positive carbon felt electrode and the negative carbon felt electrode prepared by the methods above, 3 ml of an organic electrolyte solution was added and assembled. A bolt where a coned disc spring was inserted was tightened using a torque wrench in a diagonal order until a torque of 1.5 Newton meters ("Nm"). After completing assembly, a residual electrolyte solution was injected through injection holes of each electrode and the injection holes were blocked using a Teflon® bolt. One Teflon® bolt having a gas leak hole was used in each bipolar plate.

Example 2

The same method in Example 1 was used to prepare a redox flow battery, except for using $Co(4,4'-diMethoxy-bpy)_3$TFSI instead of $Co(4,4'-diMe-bpy)_3$TFSI.

Comparative Example 1

1 M $V^{2+}$ and $V^{5+}$ solutions were prepared from an aqueous solution having 1 M of $VOSO_4$ (Aldrich, 97% hydrate) and 2 M of $H_2SO_4$ (Aldrich 96% solution) and used as a catholyte and an anolyte. As an electrode, a carbon felt (Nippon Graphite, GF20-3, t=3 mm, A=5×5 $cm^2$) was used, and as an ion-exchange membrane, Nafion 117® substituted with hydrogen ions was used. All of the methods and order of assembling a vanadium battery are the same as the methods and the order of assembling the battery of Example 1.

Comparative Example 2

The same methods in Example 1 were used to prepare a redox flow battery, except for using $Co(bpy)_3$TFSI instead of $Co(4,4'-diMe-bpy)_3$TFSI.

Evaluation of Charge/Discharge (Non-Flow Type Battery)

A charge/discharge test was performed by using the battery prepared above at room temperature (25° C.).

Conditions of charge/discharge were varied according to a composition of the battery. A charging was performed at a constant current with about 5 milliamperes ("mA") to about 10 mA up to about 2.6 V to about 2.8 V. A discharging was performed at a constant current at about 5 mA to about 10 mA up to 1.8 V.

A result of the charge/discharge test is shown in Table 1.

TABLE 1

| | | | Efficiency (%) | |
| --- | --- | --- | --- | --- |
| | System | OCV, V | Charge/discharge | Energy |
| Comparative Example 1 | All VRB | 1.36 | 22.7 | 22.4 |
| Comparative Example 2 | $Fe(bpy)_3/Co(bpy)_3$ | 2.08 | 92 | 83 |
| Example 1 | $Fe(bpy)_3/Co(di-Me-bpy)_3$ | 2.37 | 94 | 86 |
| Example 2 | $Fe(bpy)_3/Co(di-Methoxy-bpy)_3$ | 2.70 | 90 | 80 |

Charge/discharge efficiency is discharge quantity divided by charge quantity as a percentage, and energy efficiency is a multiplication of voltage efficiency and charge/discharge efficiency.

As shown in Table 1, the redox flow battery, according to an embodiment, has a greater OCV when compared to a vanadium redox flow battery or when compared to a metal-ligand coordination compound only including ligands without electron donating groups as an electrolyte. Particularly, in the case of $Fe(bpy)_3/Co(di-Me-bpy)_3$, charge/discharge efficiency and energy efficiency increased as well.

As described above, according to one or more of the above embodiments, a redox flow battery having a high energy density is provided by the invention.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A redox flow battery comprising:
   a positive electrode cell comprising
      a positive electrode and
      a catholyte solution;
   a negative electrode cell comprising
      a negative electrode and
      an anolyte solution; and
   an ion-exchange membrane disposed between the positive electrode cell and the negative electrode cell,
   wherein the catholyte solution and the anolyte solution each comprises
      a non-aqueous solvent,
      a supporting electrolyte, and
      an electrolyte comprising a metal-ligand coordination compound,
   wherein the metal-ligand coordination compound has a metal and a ligand,
   wherein the metal-ligand coordination compound comprises a nitrogen-containing heteroaromatic ligand, a nitrogen-containing heteroaliphatic ligand, or a combination thereof,
   wherein the metal-ligand coordination compound in at least one of the catholyte solution and the anolyte solution further comprises at least one electron donating group,
   wherein when the metal-ligand coordination compound comprises the nitrogen-containing heteroaromatic ligand, the at least one electron donating group is selected from a hydroxyl group, a thiol group, an alkyl group, an alkoxy group, an alkylthio group, an aryl group, an aryloxy group, an arylthio group, an alkenyl group, an alkynyl group, an amide group, an ester group, and an amine group (—$NR_2$, wherein R is an alkyl group having 1 to 6 carbon atoms), and
   wherein when the metal-ligand coordination compound comprises the nitrogen-containing heteroaliphatic ligand, the at least one electron donating group is selected from a hydroxyl group, a thiol group, an alkoxy group, an alkylthio group, an aryl group, an aryloxy group, an arylthio group, an alkenyl group, an alkynyl group, an amide group, an ester group, and an amine group (—$NR_2$, wherein R is an alkyl group having 1 to 6 carbon atoms).

2. The redox flow battery of claim 1, wherein the metal-ligand coordination compound comprises at least one metal selected from nickel, cobalt, iron, ruthenium, zinc, manganese, yttrium, zirconium, titanium, chromium, magnesium, cerium, copper, lead, and vanadium.

3. The redox flow battery of claim 1, wherein the nitrogen-containing heteroaromatic ligand or the nitrogen-containing heteroaliphatic ligand is at least one selected from a substituted or unsubstituted dipyridyl, a substituted or unsubstituted terpyridyl, a substituted or unsubstituted phenanthroline, a substituted or unsubstituted ethylenediamine, a substituted or unsubstituted propylenediamine, and a substituted or unsubstituted N-heterocyclic carbene.

4. The redox flow battery of claim 3, wherein the N-heterocyclic carbene is at least one selected from 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole, and 1-ethyl-3-methylimidazole.

5. The redox flow battery of claim 1, wherein the electron donating group is at least one selected from a methyl group, a methoxy group, a methylthio group, a phenyl group, a hydroxyl group, an alkylcarboxy group, an alkylcarbamino group, and an amino group.

6. The redox flow battery of claim 5, wherein the metal-ligand coordination compound is at least one selected from the compounds:

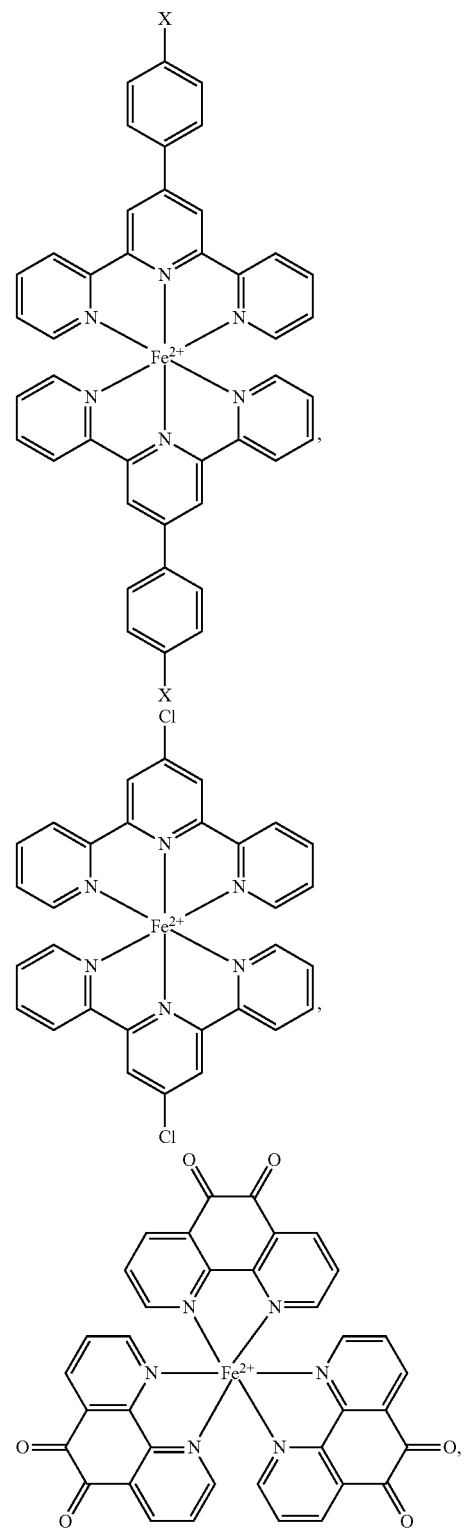

-continued

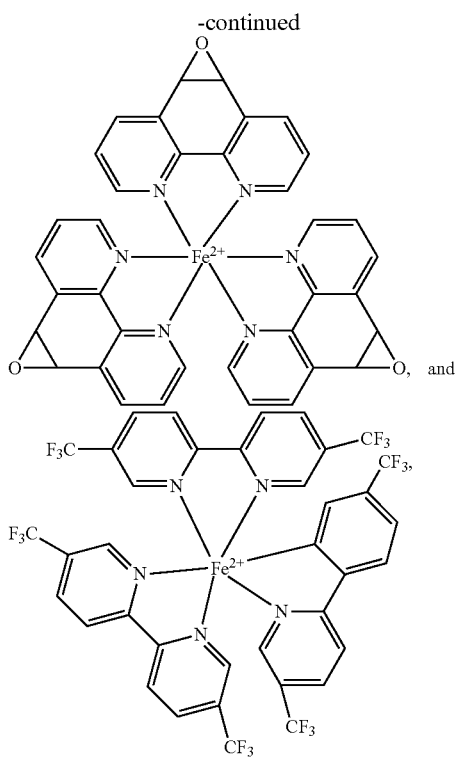

wherein X is H, OH, Br, or Cl.

7. The redox flow battery of claim 1, wherein the electrolyte further comprises a metal-ligand coordination compound comprising a ligand comprising an electron withdrawing group.

8. The redox flow battery of claim 7, wherein the electron withdrawing group is at least one selected from a haloalkyl group, an alkenyl group, a halogen atom, —N-(alkyl)$_3^+$, —N-(alkyl)$_2$H$^+$, —N-(alkyl)H$_2^+$, —S-(alkyl)$_2^+$, —NH$_3^+$, —SO-(alkyl), —SO-(aryl), —SO$_2$-(alkyl), —SO$_2$-(aryl), —P(O)(OH)$_2$, —P(O)(OH)(O-alkyl), —P(O)(OH)(O-aryl), —P(O)(O-alkyl)$_2$, —P(O)(O-aryl)$_2$, —P(O)(O-alkyl)(O-aryl), —C(O)OH, a cyclopentadienyl group, —C(O)O-(alkyl), —C(O)O-(aryl), —C(O)NH-(alkyl), —C(O)NH-(aryl), —C(O)-(alkyl), —C(O)-(aryl), —CHO, a nitrile group, a nitro group, a heterocyclic group, and an aryl group.

9. The redox flow battery of claim 1, wherein the anolyte solution comprises the metal-ligand coordination compound.

10. The redox flow battery of claim 1, wherein the metal-ligand coordination compound having the metal and the ligand is at least one selected from the compounds:

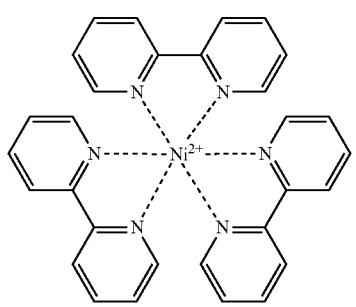

-continued

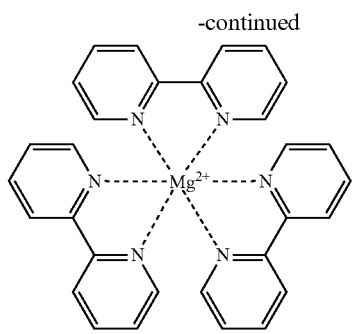

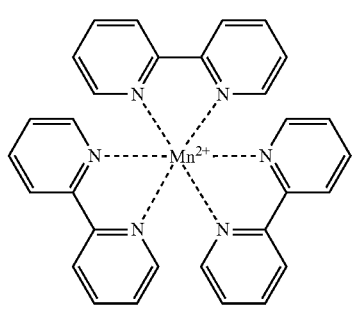

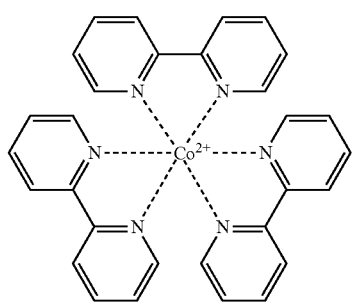

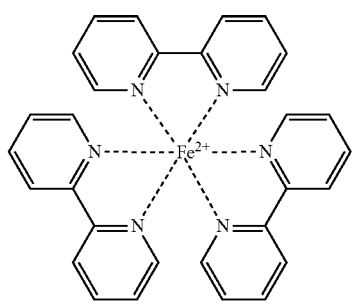

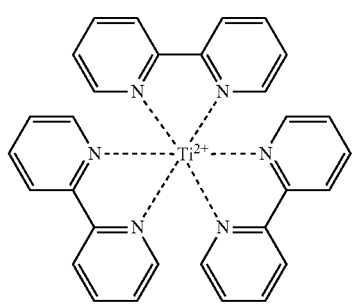

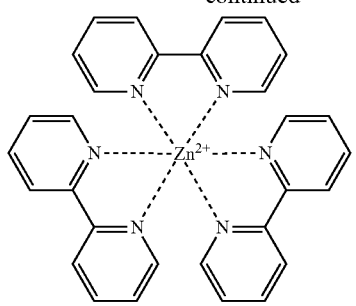,
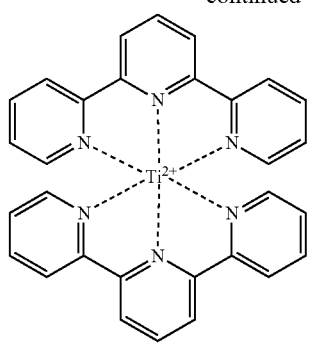,
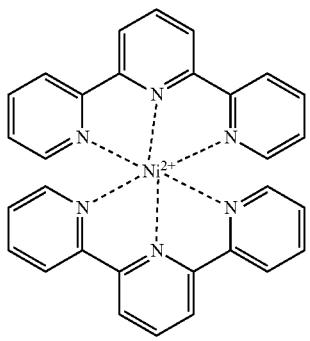,
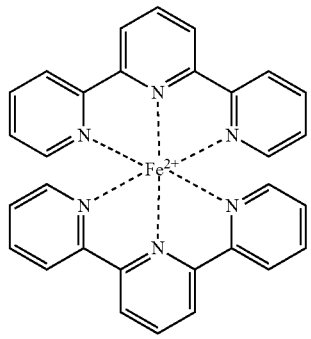,
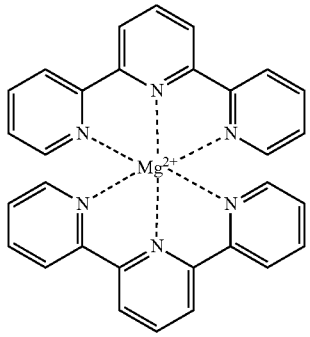,
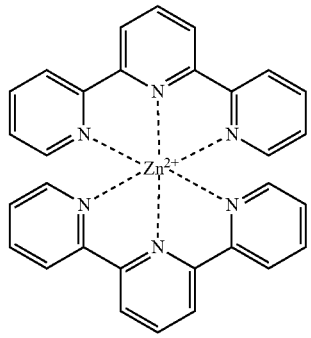,
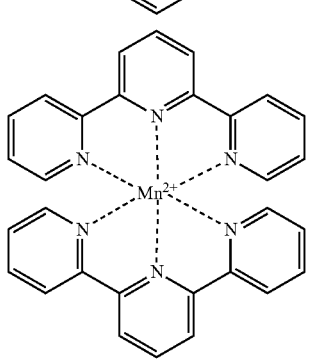,
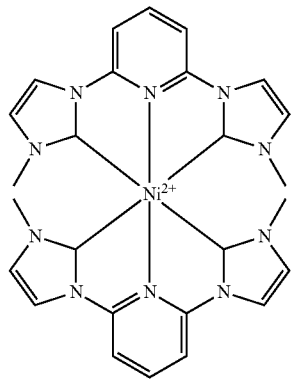,

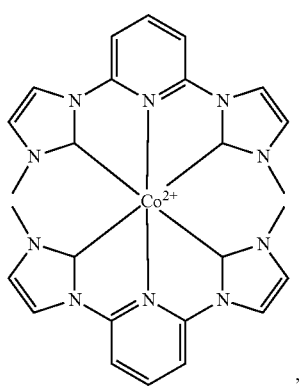
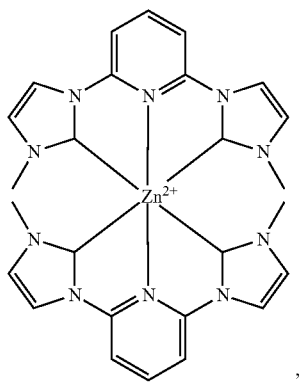
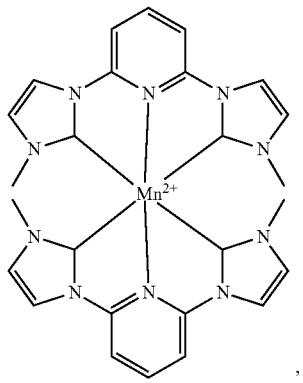
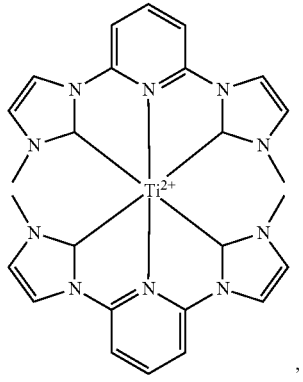
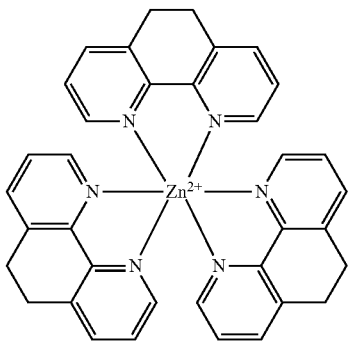
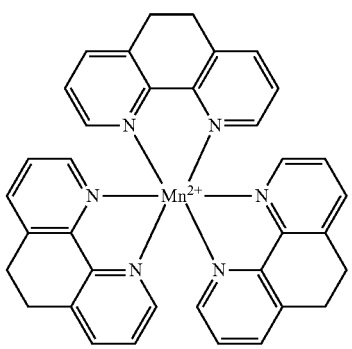
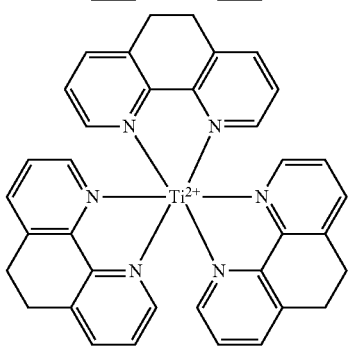
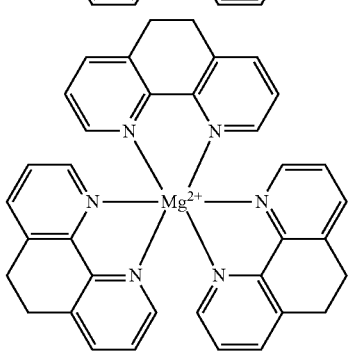
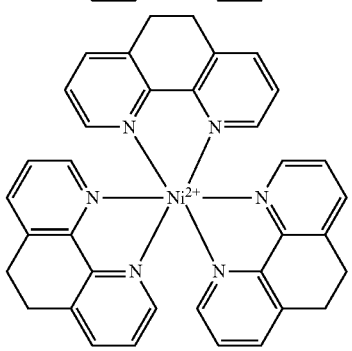

-continued
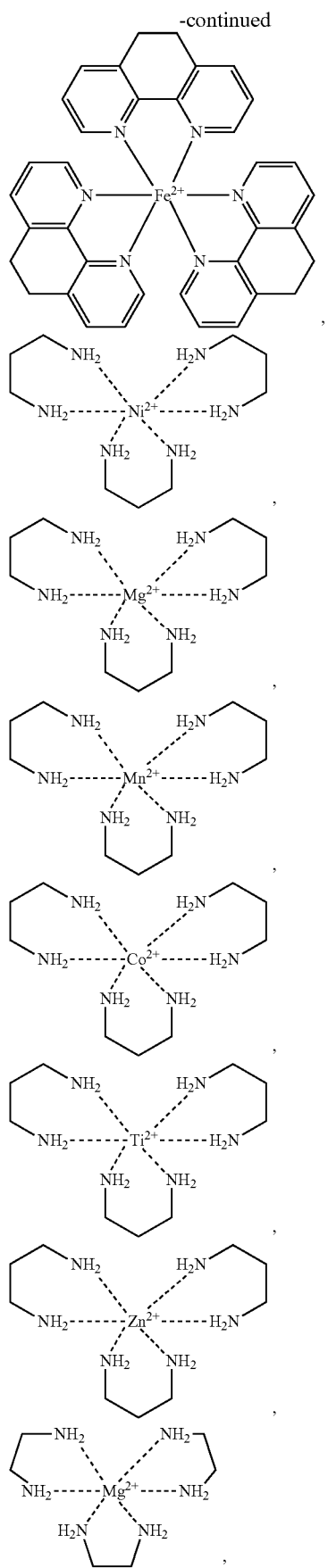
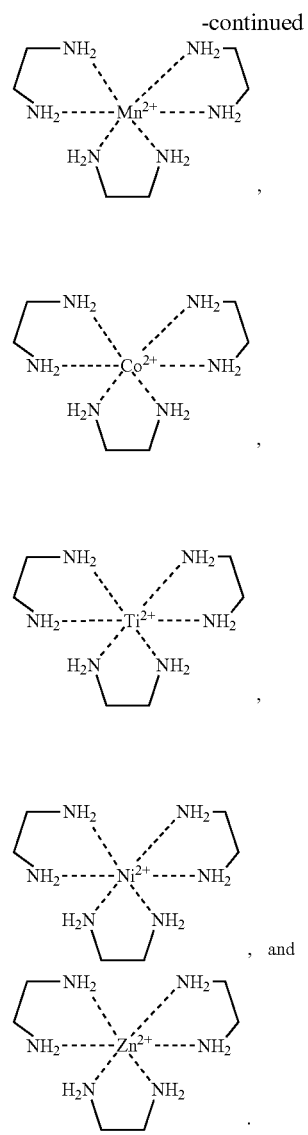
11. The redox flow battery of claim 1, wherein the metal-ligand coordination compound having the metal and the ligand and further comprising the electron donating group bound to the ligand is at least one selected from the compounds:
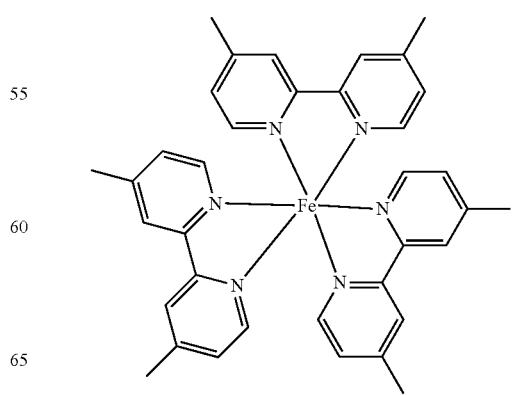

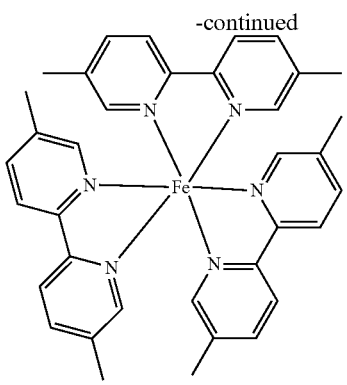

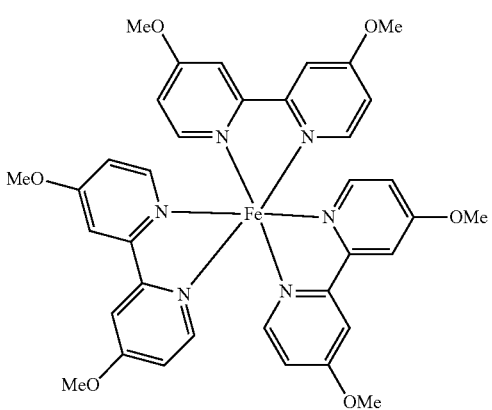

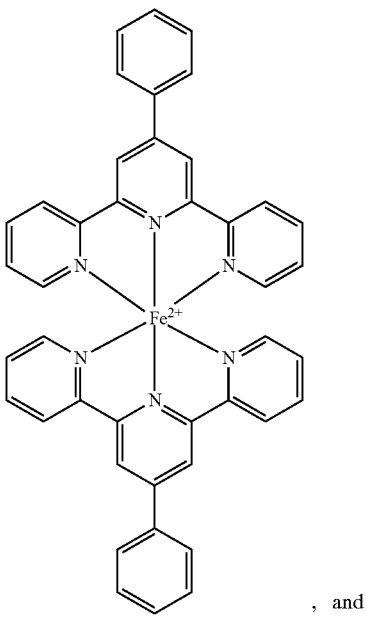

, and

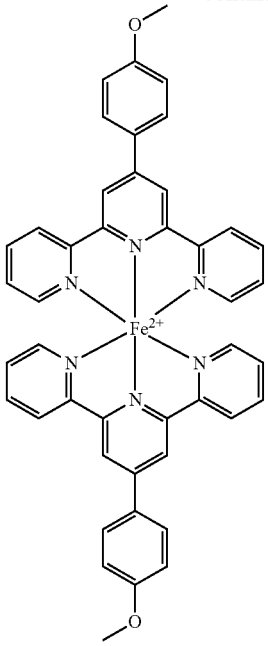

12. The redox flow battery of claim 1, wherein the metal-ligand coordination compound undergoes a reversible oxidation/reduction reaction.

13. The redox flow battery of claim 12, wherein a non-aqueous solvent is at least one selected from dimethyl acetamide, diethyl carbonate, dimethyl carbonate, acetonitrile, γ-butyrolactone, propylene carbonate, ethylene carbonate, N-methyl-2-pyrrolidone, fluoroethylene carbonate, and N,N-dimethylacetamide.

14. The redox flow battery of claim 1, wherein the metal-ligand coordination compound comprises $BF_4^-$, $PF_6^-$, $CF_3SO_3^-$, or $(CF_3SO_2)_2N^-$ as a counter ion.

15. The redox flow battery of claim 1, wherein the supporting electrolyte is at least one selected from $LiBF_4$, $LiPF_6$, $LiClO_4$, $LiCF_3SO_3$, $Li(CF_3SO_2)_2N$, $LiSbF_6$, $LiAsF_6$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, triethylamine tetrafluorborate, tributylamine tetrafluorborate, $NaBF_4$, $NaPF_6$, trimethylsulfonyl chloride, and $(NH_4)_2SO_4$.

16. The redox flow battery of claim 1, wherein the ion-exchange membrane is an anion exchange membrane.

17. The redox flow battery of claim 16, wherein the anion exchange membrane is a product of aminating a copolymer of styrene-divinylbenzene comprising a chloromethyl group, a product of substituting a copolymer of vinylpyridine-divinylbenzene with a quarternary pyridinium salt, or a product of aminating an aromatic polysulfone copolymer comprising a chloromethyl group.

18. The redox flow battery of claim 1 further comprising a catholyte tank and an anolyte tank, wherein the catholyte tank is fluid connected to the positive electrode cell, and the anolyte tank is fluid connected to the negative electrode cell.

* * * * *